United States Patent [19]
Maki, Jr.

[11] 3,727,937
[45] Apr. 17, 1973

[54] SNOWMOBILE TOWING HITCH

[76] Inventor: Earl G. Maki, Jr., Sullivan, Wis. 53718

[22] Filed: Jan. 5, 1972

[21] Appl. No.: 215,539

[52] U.S. Cl. ................280/24, 280/494, 280/491 B
[51] Int. Cl. .............................................B62b 13/00
[58] Field of Search........................280/24, 492, 493, 280/494, 491 B; 180/5 R

[56] References Cited

UNITED STATES PATENTS

| 881,708 | 3/1908 | Noyes | 280/24 |
| 2,743,118 | 4/1956 | Dotson | 280/478 |
| 2,795,435 | 6/1957 | Ortiz et al. | 280/493 X |
| 3,464,735 | 9/1969 | Smith | 296/23 |
| 3,560,013 | 2/1971 | Lee | 280/24 X |

FOREIGN PATENTS OR APPLICATIONS 561,098   4/1957   Italy .....................................280/493

Primary Examiner—Leo Friaglia
Attorney—Joseph G. Werner et al.

[57] ABSTRACT

A hitch for towing one snowmobile with another which can be quickly disassembled for storage and transporting and readily reassembled for use. The hitch has a T-shaped tongue having an extendible cross member assembly. The outer ends swivel about the elongate axis of the cross member assembly. A pair of attaching clamp units are pivotally mounted in the swivel ends of the cross member assembly for clamping on the toe braces of the skis of a snowmobile which is to be towed.

5 Claims, 2 Drawing Figures

PATENTED APR 17 1973  3,727,937

3,727,937

SNOWMOBILE TOWING HITCH

BACKGROUND OF THE INVENTION

This invention relates to towing hitches and more particularly to a knock-down hitch for towing one snowmobile with another.

The usual practice for towing broken down snowmobile from a remote area to a location where it can be repaired is to merely tow the inoperable snowmobile with a rope attached to the rear of another snowmobile. This approach has several shortcomings and is needlessly unsafe because of the danger of the rope breaking, the possibility of the towed snowmobile crashing into the rear of the towing snowmobile and the people thereon particularly when stopping, and no steering is provided for the towed snowmobile.

SUMMARY OF THE INVENTION

Basically, this invention resides in a snowmobile towing hitch that is safe and effective in use and which can be readily knocked down for storage and transporting. The hitch has a fixed dimension from front to back whereby the towing and towed snowmobiles are maintained a fixed, safe distance apart. Further, the attaching clamps at the ends of the cross member assembly are fastened to the toe braces of the snowmobile which is to be towed to provide positive steering of the towed vehicle.

The cross member assembly of the hitch is adjustable to facilitate use on snowmobiles having different width dimensions between skis.

In addition, the cross member assembly and attaching clamp units are suitably pivotable above transverse axes to permit necessary movement during towing.

When not in use, the hitch can be quickly knocked down or disassembled for compact storage and can be conveniently carried as an accessory on a snowmobile for use when the need arises.

Further objects, features and advantages of the invention will be apparent from the following detailed description taken in conjunction with the accompanying drawings showing a preferred embodiment for exemplification of the principles of the invention.

DESCRIPTION OF A PREFERRED EMBODIMENT

Figure 1:
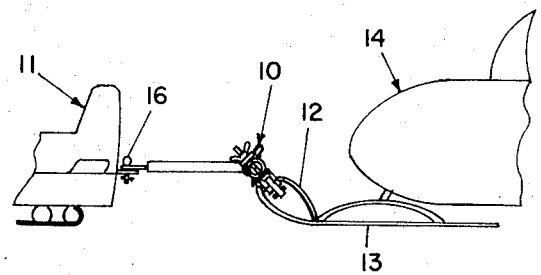
FIG. 1 is a fragmentary elevation view showing a towing hitch embodying my invention in use on a towing and towed snowmobile.
Figure 2:
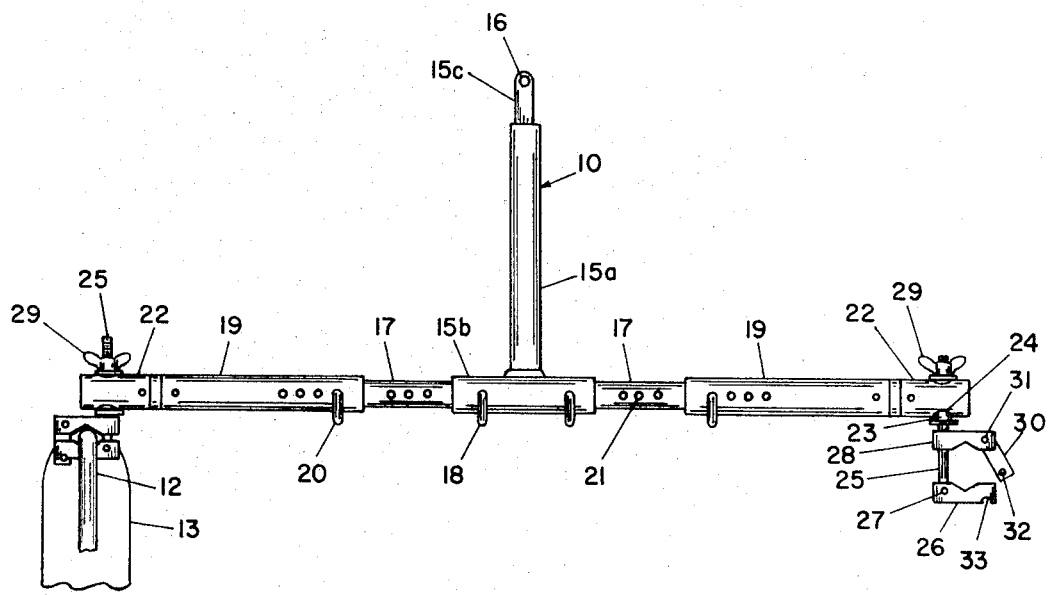
FIG. 2 is a plan view of my snowmobile towing hitch showing one attaching clamp unit tightened on the toe brace of the ski of a snowmobile and the other attaching clamp unit in open position.

Referring now more particularly to the drawings wherein like numerals refer to like parts in both views, my hitch is referred to generally in the drawings by numeral 10. FIG. 1 shows the hitch as it is attached to the rear of a towing snowmobile 11 and the toe brace 12 of the skis 13 of a snowmobile 14 to be towed.

The hitch has a T-shaped steel tongue having a longitudinal stem 15a and a tubular cross member 15b. The stem has a flat end 15c which is attached to the rear of a snowmobile by a hitch pin 16 for swinging in a substantially horizontal plane.

A pair of steel lateral connector members 17 have their inner ends inserted into the tubular cross member 15b and are held in fixed relation therein by removable pins 18 extending through the members.

A pair of tubular steel lateral extension members 19 have their inner ends telescopically received on the outer ends of the connector members 17. The lateral extension members are held in fixed position by pins 20 extending through the members. These members each have a series of laterally spaced holes 21 for adjusting the width of the hitch so that it can be used to tow any snowmobile regardless of the spacing between the skis thereof.

The lateral extension members 19 have outer swivel ends 22 which are rotatable with respect to their fixed inner ends about the elongate axis of the extension members.

A pair of attaching clamp units are mounted on the outer swivel ends of the lateral extension members for receiving and clamping on the front toe braces of the skis of the snowmobile which is to be towed. Each attaching clamp unit is mounted by a cylindrical spacer sleeve 23 rotatably received in an opening 24 extending transversely through the swivel end of the lateral extension member for rotation about a second axis perpendicular to the elongate axis of the extension member. Each spacer sleeve is slightly longer that the cross section of the swivel end through which it extends. A stud 25 extends longitudinally through each spacer sleeve from front to rear and has a threaded front end.

Each attaching clamp unit has a pair of clamping jaws 26 and 28. The first jaw 26 is mounted on the end of stud 25 opposite the threaded end by a pin 27. The jaw 26 is substantially fixed in position, however, it may have a slight pivotal movement about its connecting pin to facilitate placement of the attaching clamp unit on the toe brace of a snowmobile ski. The second jaw 28 of each clamping unit is slideably received on the mounting stud between the fixed jaw 26 and the spacer sleeve 23.

Each attaching clamp unit has a locking member 30 pivotally mounted by pin 31 to clamping jaw 28. The locking member carriers a cross pin 32 in its free end which is releaseably engageable in a groove 33 formed in the jaw 26 for linking the clamping jaws together about the toe brace of a snowmobile ski.

A tightener shown in the form of wing nut 29 is threaded on the end of stud 25 for drawing the clamping jaws toward one another. When the jaws are clamped about the tow brace of a snowmobile ski, the spacer sleeve 23 maintains the freedom of movement of the attaching clamp unit about its pivot axis.

It is understood that my invention is not confined to the particular construction and arrangement of parts herein illustrated and described, but embraces all such modified forms thereof as come within the scope of the following claims.

I claim:

1. A hitch for towing one snowmobile with another, comprising:
    a. a rigid T-shaped tongue for substantially horizontal pivotal attachment to a towing snowmobile,
    b. a pair of rigid lateral connector members removably pinned in fixed relation to the cross member of said T-shaped tongue, c. a pair of rigid elongate lateral extension members having their inner ends telescopically mounted on said connector members for axial adjustment thereon and removal therefrom, said extension members having outer swivel ends rotatable with respect to said inner ends about the elongate axis of said extension members, d. a pair of attaching clamp units mounted on the outer swivel ends of said lateral extension members for receiving and clamping on the front toe braces of the skis of a snowmobile to be towed, said attaching clamp units being pivotally movable about an axis substantially perpendicular to the elongate axis of said lateral extension members.

2. The snowmobile towing hitch as specified in claim 1, wherein each of said attaching clamp units comprise:

a. a cylindrical spacer sleeve rotatably received in the swivel end of said lateral extension member for rotation about a second axis substantially perpendicular to the elongate axis of said extension member, said spacer sleeve being longer than the cross section of the swivel end through which it extends, b. a stud extending through said spacer sleeve and having a threaded end, c. a pair of clamping jaws mounted on the end of said stud opposite said threaded end, and d. a tightener on the threaded end of said stud for drawing said clamping jaws toward one another, said spacer sleeve maintaining the free movement of said attaching clamp unit in said swivel end about said second axis.

3. The snowmobile towing hitch as specified in claim 2, wherein the first jaw of said pair of clamping jaws is mounted on the end of said stud opposite said threaded end and the second jaw is slideably received on said stud between said first jaw and said spacer sleeve.

4. The snowmobile towing hitch as specified in claim 2 wherein each of said attaching clamp units has a locking member pivotally mounted on one of said jaws and releaseably engageable with the other jaw of said pair of jaws for linking said jaws together.

5. The snowmobile towing hitch as specified in claim 1 having a series of spaced adjustment holes in said members for adjusting the lateral position of said clamping units.

* * * * *